United States Patent
Ota et al.

(10) Patent No.: US 9,842,556 B2
(45) Date of Patent: Dec. 12, 2017

(54) DISPLAY DEVICE AND METHOD OF DRIVING THE SAME

(71) Applicant: Japan Display Inc., Tokyo (JP)

(72) Inventors: Jin Ota, Tokyo (JP); Hidetoshi Komatsu, Tokyo (JP); Ryutaro Nitobe, Tokyo (JP); Nobuhiko Yokoo, Tokyo (JP)

(73) Assignee: Japan Display Inc., Tokyo (JP)

( * ) Notice: Subject to any disclaimer, the term of this patent is extended or adjusted under 35 U.S.C. 154(b) by 87 days.

(21) Appl. No.: 14/854,903

(22) Filed: Sep. 15, 2015

(65) Prior Publication Data

US 2016/0078832 A1   Mar. 17, 2016

(30) Foreign Application Priority Data

Sep. 16, 2014 (JP) ................. 2014-187890

(51) Int. Cl.
  *G06F 3/038*   (2013.01)
  *G09G 3/36*    (2006.01)
  *G06F 3/041*   (2006.01)
  *G09G 5/12*    (2006.01)

(52) U.S. Cl.
  CPC ......... *G09G 3/3655* (2013.01); *G06F 3/0412* (2013.01); *G09G 5/12* (2013.01); *G09G 2300/0426* (2013.01); *G09G 2310/061* (2013.01); *G09G 2320/0209* (2013.01); *G09G 2330/022* (2013.01); *G09G 2330/025* (2013.01)

(58) Field of Classification Search
None
See application file for complete search history.

(56) References Cited

U.S. PATENT DOCUMENTS

2013/0113735 A1   5/2013   Takeuchi et al.
2014/0204041 A1*  7/2014   Munechika ........... G06F 3/0416
                                                         345/173

FOREIGN PATENT DOCUMENTS

JP   2013-101427   5/2013

* cited by examiner

*Primary Examiner* — Ifedayo Iluyomade
(74) *Attorney, Agent, or Firm* — K&L Gates LLP

(57) ABSTRACT

According to one embodiment, a display device includes a display unit and a driver unit. The driver unit includes a display drive unit, a power supply unit and a control unit. The control unit instructs a display period in which the image is displayed in the display unit and a non-display period in which the image is not displayed to the display drive unit, and instructs mitigation driving which mitigates a difference in an electrical load of the display drive unit between the display period and the non-display period to the power supply unit in the non-display period.

14 Claims, 14 Drawing Sheets

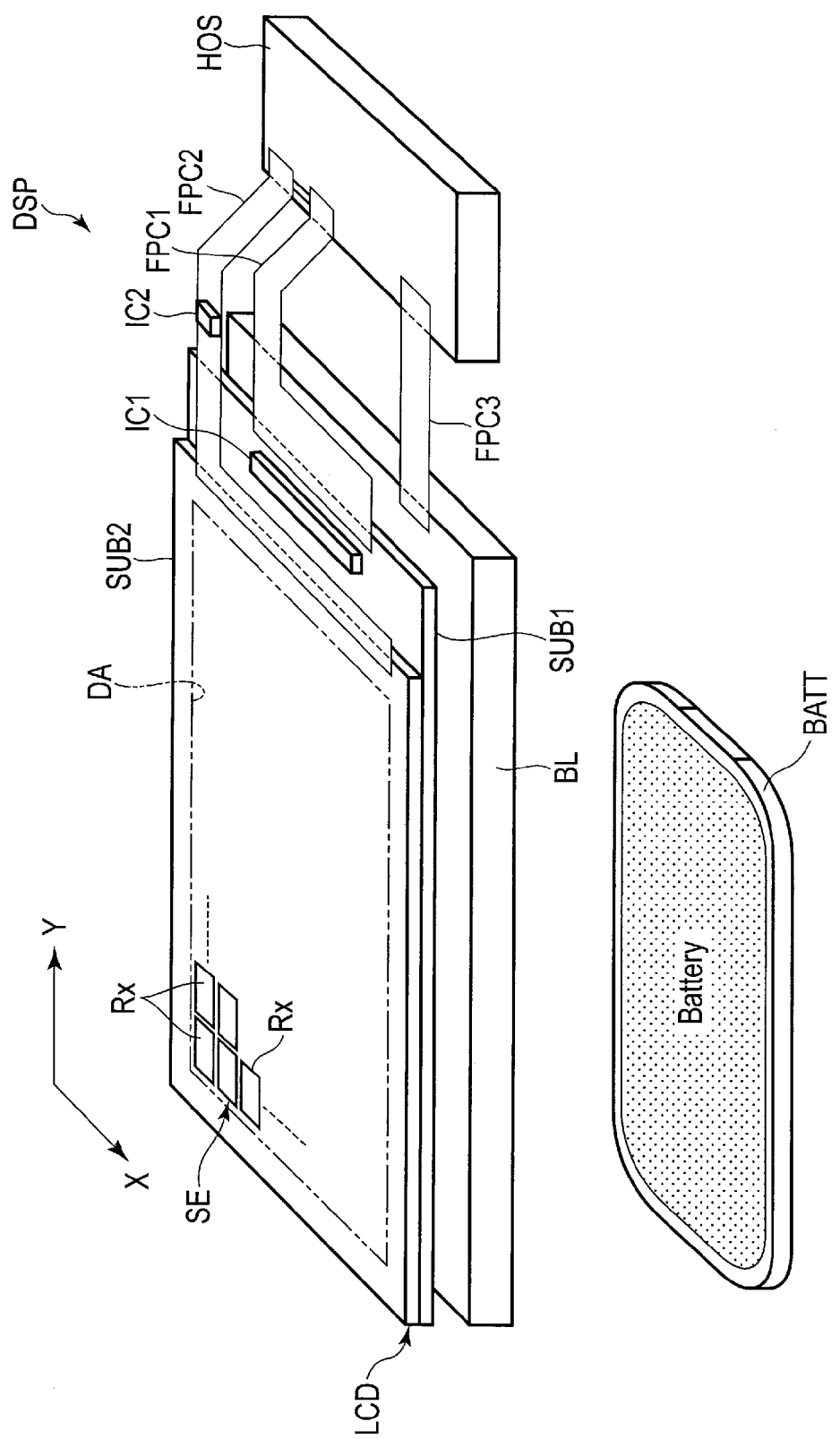
F I G. 1

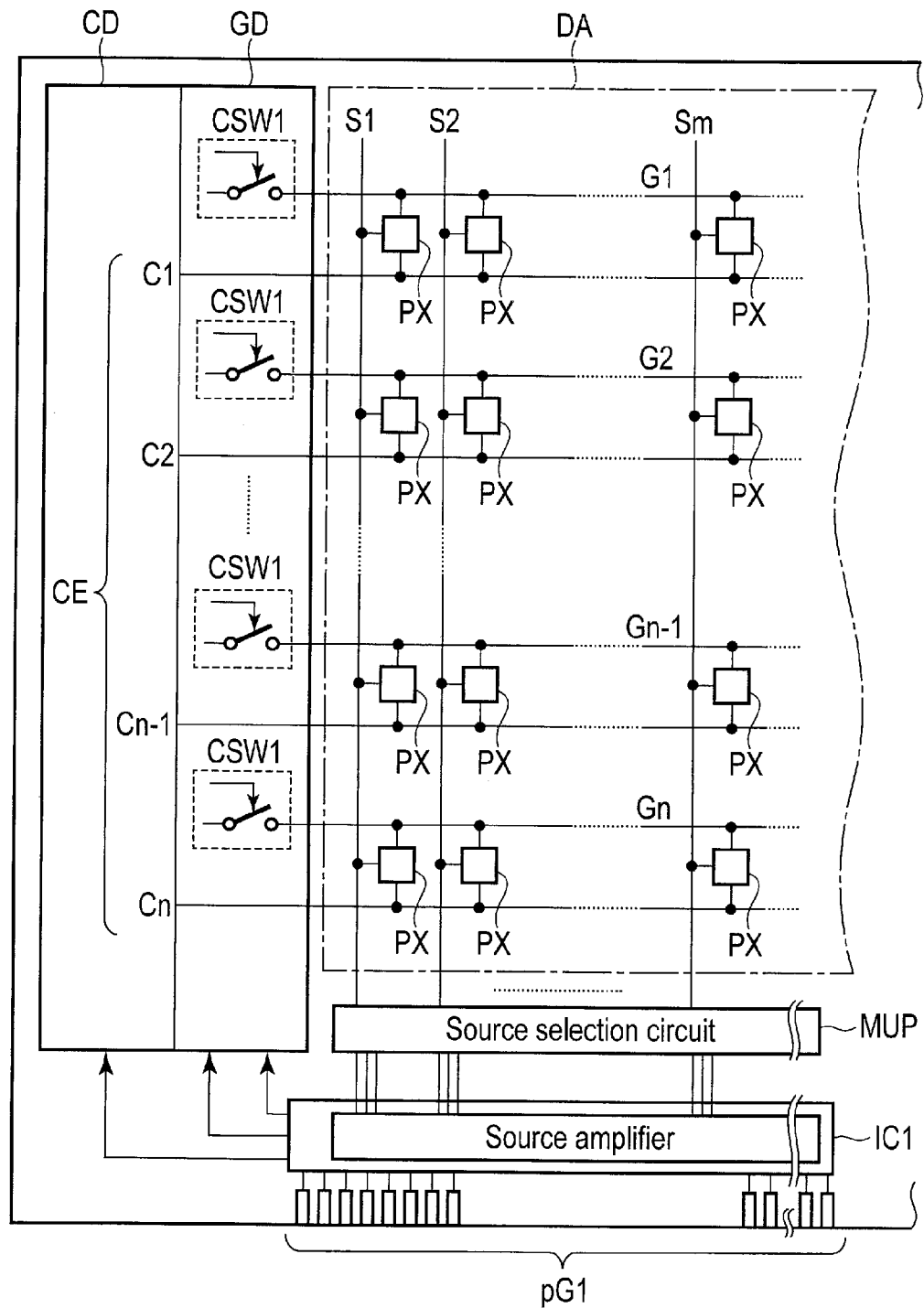
F I G. 3

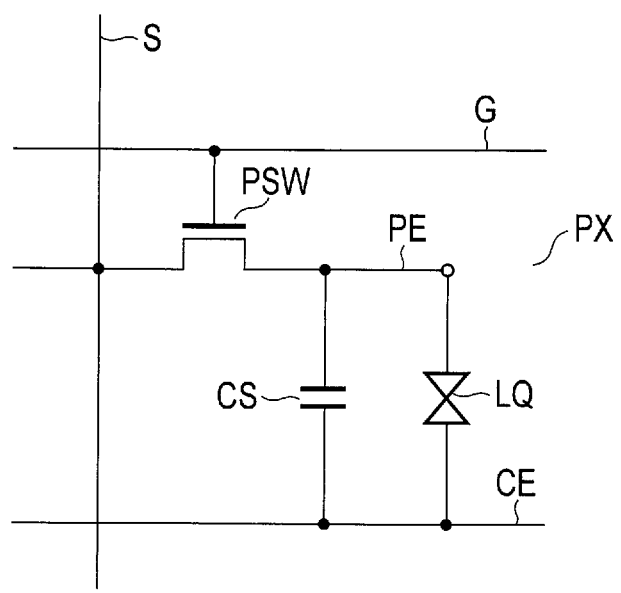
F I G. 4

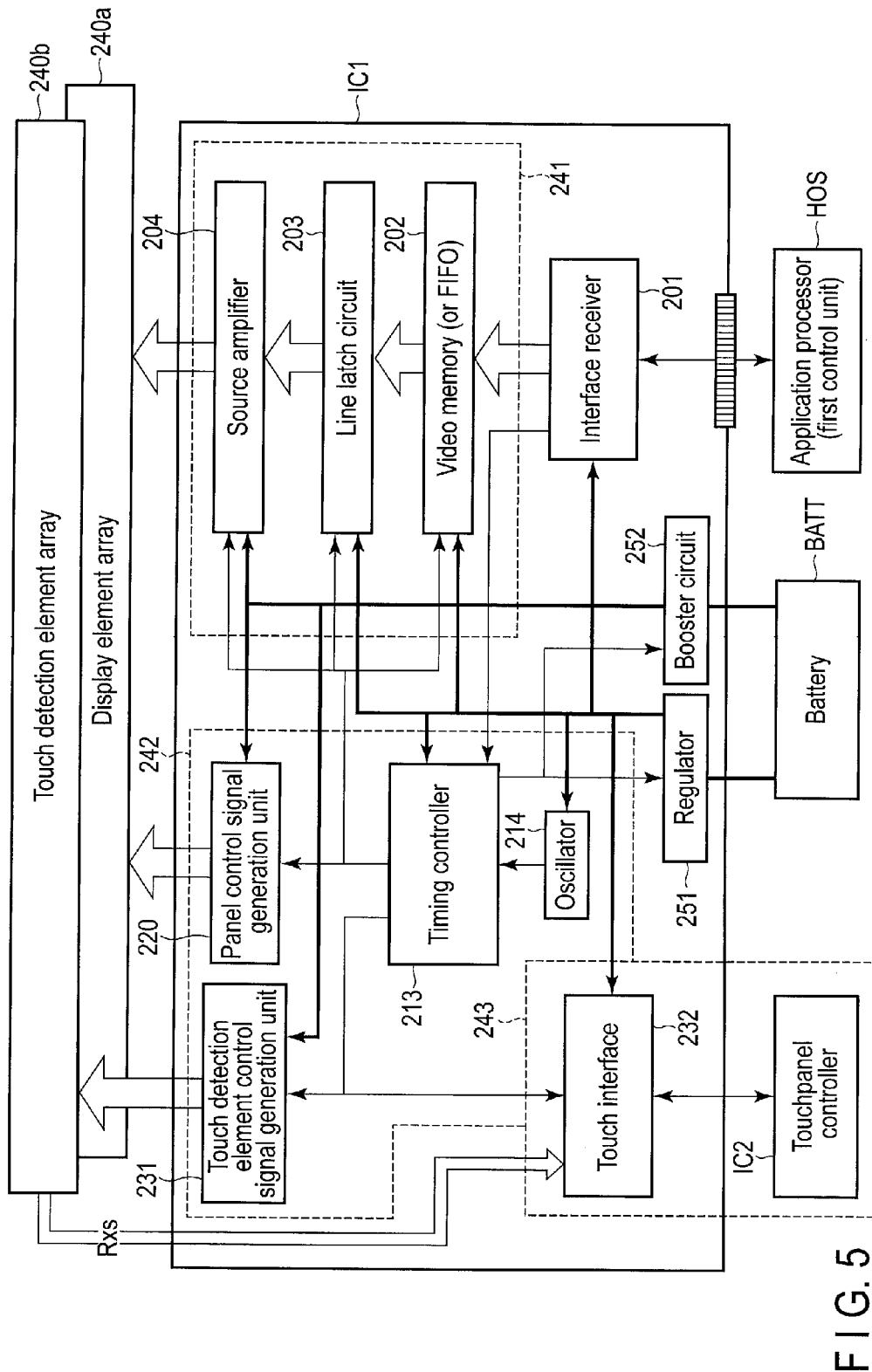
F I G. 5

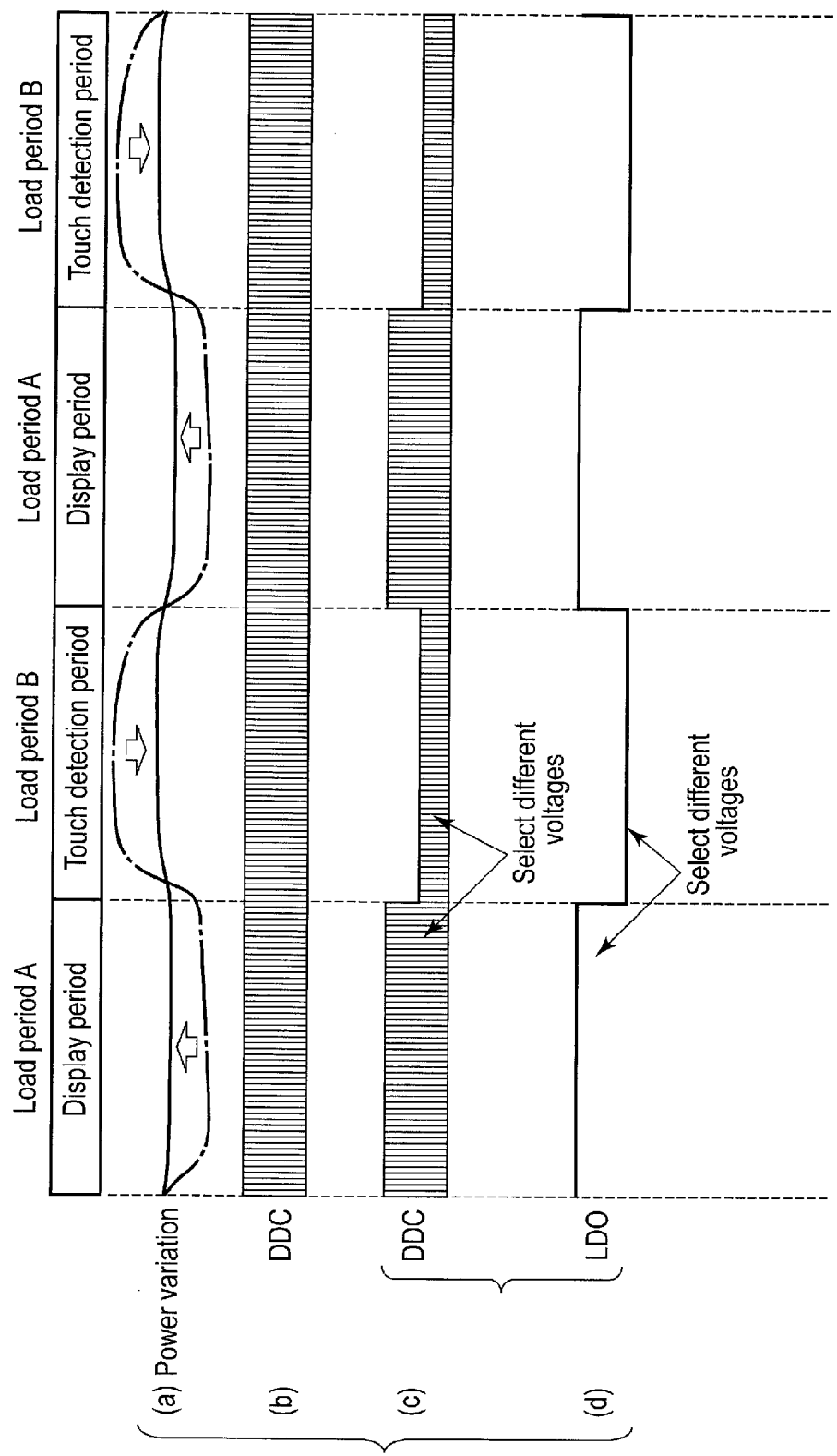
F I G. 11

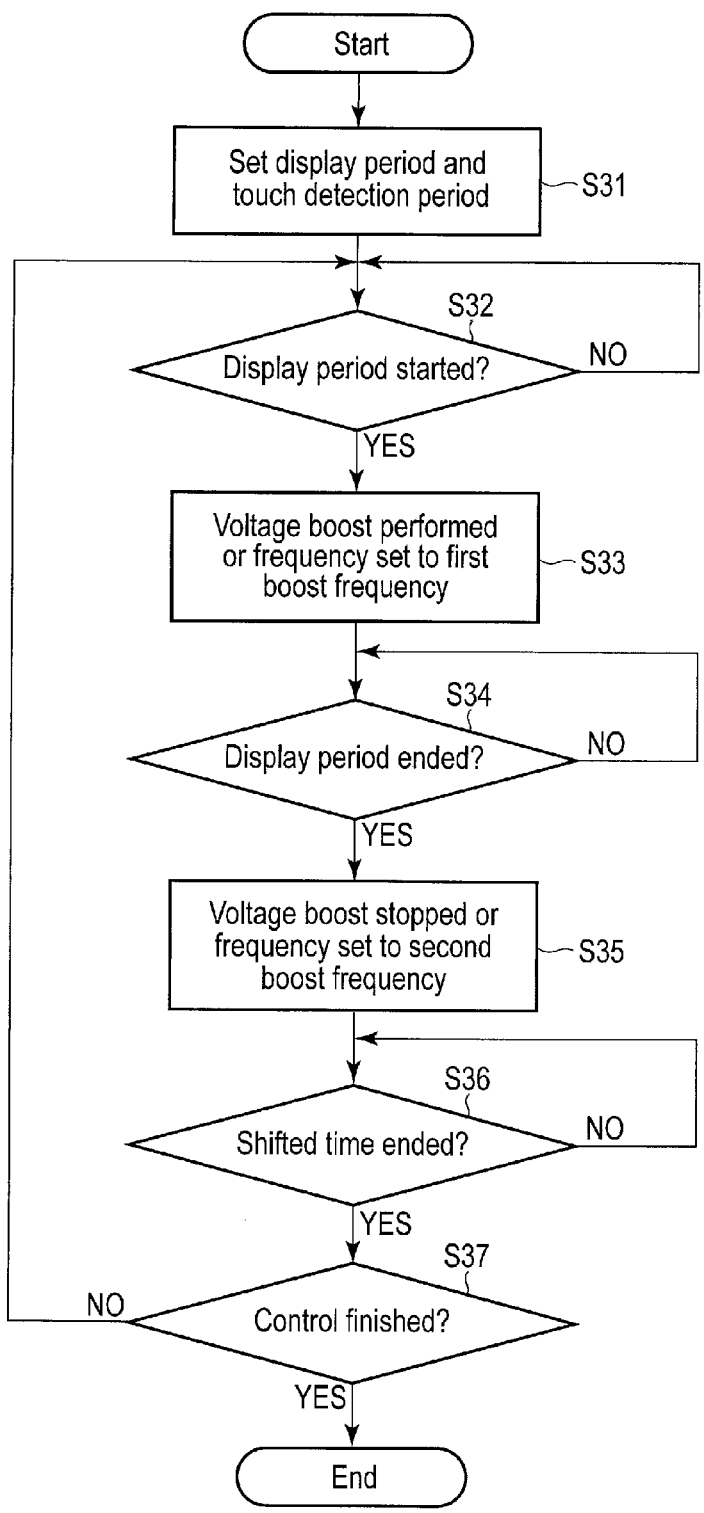
F I G. 12

DISPLAY DEVICE AND METHOD OF DRIVING THE SAME

CROSS REFERENCES TO RELATED APPLICATIONS

The present application claims priority to Japanese Priority Patent Application JP 2014-187890 filed in the Japan Patent Office on Sep. 16, 2014, the entire content of which is hereby incorporated by reference.

FIELD

Embodiments described herein relate generally to a display device which repetitively exhibits a display period and a non-display period periodically, and a method of driving the same.

BACKGROUND

A mobile terminal (a smartphone, personal assistant device [PAD], tablet computer, etc.) includes a display device of liquid crystal, organic electroluminescent (EL), and the like. Also, in a display device used for a mobile terminal, additional features, such as a touch sensor, are generally added.

Meanwhile, in a liquid crystal display device to which a touch sensor function, for example, is added, while the touch sensor is operated in a blanking period of liquid crystal driving, a panel driving load differs in a display driving period (hereinafter referred to as a display period) and a sensing operation period (hereinafter referred to as a non-display period) of the touch sensor, and thus, a load variation may occur periodically. At this time, a booster circuit or a regulator circuit for the liquid crystal driving cannot catch up with the load variation, and thus, a ripple occurs in a power supply voltage. The ripple may produce noise due to vibration of components.

As described above, a display device which repetitively exhibits a display period and a non-display period entails a problem that a ripple occurs in the power output because of a periodic load variation, and the ripple may produce noise.

Hence, an object of the present embodiment is to provide a display device which is capable of mitigating the load variation caused by the display and non-display periodicity, thereby suppressing the ripple of the power output, and a method of driving the same.

SUMMARY

This application relates generally to a display device.

In an embodiment, a display device comprising a display unit configured to display an image; and a driver unit configured to drive the display unit, wherein the driver unit comprises a display drive unit configured to supply power to the display unit, and to selectively drive the display unit in a display state and a non-display state depending on an amount of the power supply; a power supply unit configured to supply power to the display drive unit; and a control unit configured to control the display drive unit and the power supply unit, the control unit instructing a display period in which the image is displayed in the display unit and a non-display period in which the image is not displayed to the display drive unit, and instructing mitigation driving which mitigates a difference in an electrical load of the display drive unit between the display period and the non-display period to the power supply unit in the non-display period.

In a further embodiment, a display drive method comprising supplying power to a display unit which displays an image, and selectively driving the display unit in a display state and a non-display state depending on an amount of the power supply, wherein a display period in which the image is displayed in the display unit and a non-display period in which the image is not displayed are determined; and power is supplied in the non-display period to mitigate a difference in an electrical load of display driving between the display period and the non-display period.

Additional features and advantages are described herein, and will be apparent from the following Detailed Description and the figures.

BRIEF DESCRIPTION OF THE FIGURES

FIG. 1 is a perspective view showing a schematic structure of a sensor-equipped display device to which one embodiment is applied.

FIG. 3 is an illustration which schematically shows the structure of a first substrate and an equivalent circuit in a liquid crystal display panel.

FIG. 4 is an illustration showing an equalizing circuit of pixel PX of FIG. 3.

FIG. 5 is a diagram showing a block configuration example inside a liquid crystal driver which is an IC chip to which one embodiment is applied.

FIG. 11 is a timing chart indicating the specifics of control of FIG. 10.

FIG. 12 is a flowchart showing the specifics of control which is processed by the sequencer indicated in FIG. 7, as a third embodiment for reducing load variation.

DETAILED DESCRIPTION

Figure 2:
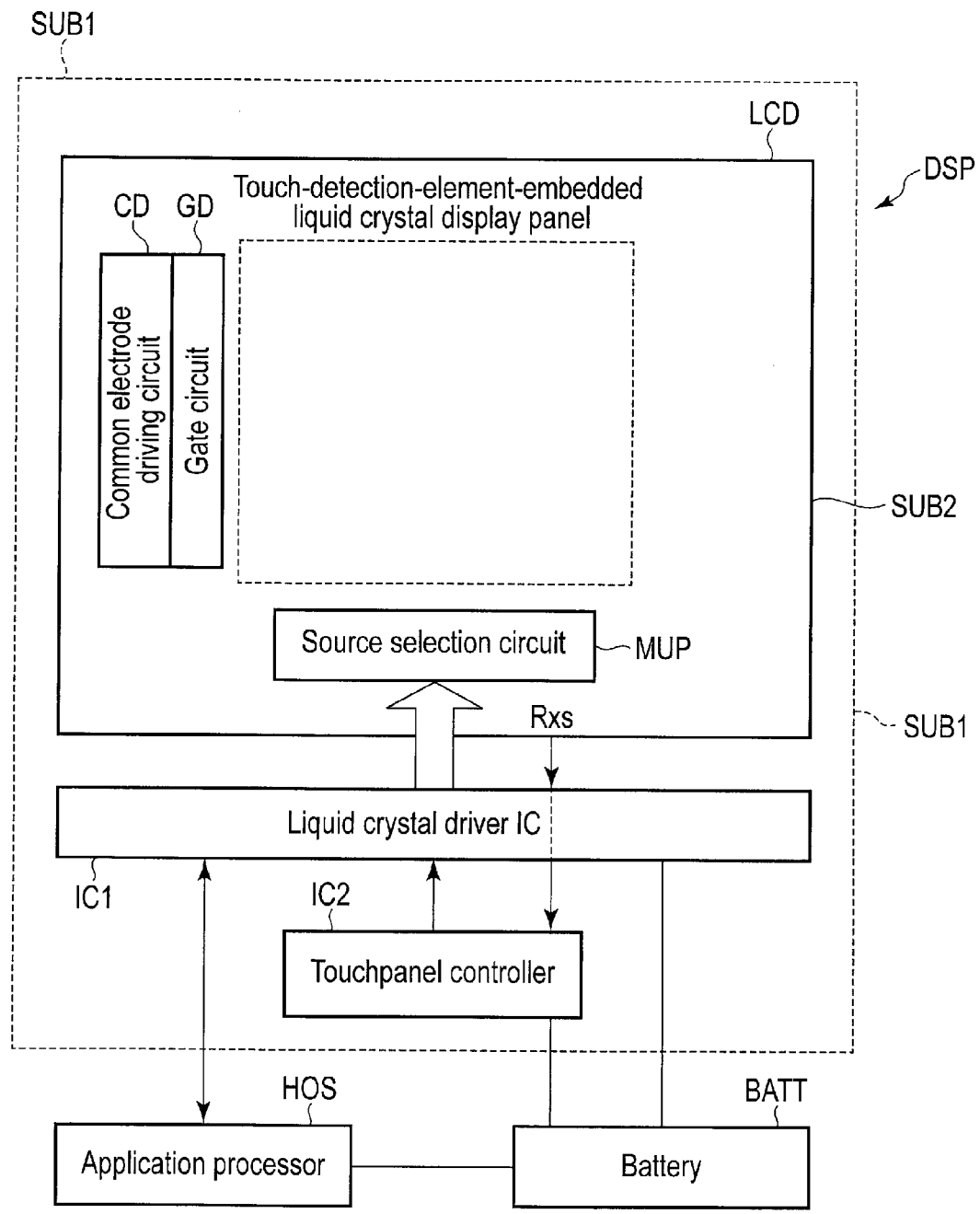
FIG. 2 is an illustration which takes out and shows a main circuit block, which is a part of FIG. 1.

Various embodiments will be described hereinafter with reference to the accompanying drawings.

The embodiment is described below. According to this embodiment, a display unit configured to display an image, and a driver unit configured to drive the display unit are provided. The driver unit comprises a display drive unit configured to supply power to the display unit, and to selectively drive the display unit in a display state and a non-display state depending on an amount of the power supply, a power supply unit configured to supply power to the display drive unit, and a control unit configured to control the display drive unit and the power supply unit. The control unit instructs a display period in which the image is displayed in the display unit and a non-display period in which the image is not displayed to the display drive unit, and instructs mitigation driving which mitigates a difference in an electrical load of the display drive unit between the display period and the non-display period to the power supply unit in the non-display period.

The above structure enables load variation caused by the display and non-display periodicity of the display device to be mitigated, thereby suppressing a ripple of a power output.

More detailed descriptions will be given referring to the drawings. FIG. 1 is a configuration diagram showing the entire blocks of a mobile terminal to which one embodiment is applied.

FIG. 1 is perspective view showing a schematic structure of a sensor-equipped display device DSP according to one embodiment. In FIG. 1, a touch-sensor-integrated liquid crystal display panel LCD comprises a first substrate SUB1, a second substrate SUB2 opposed to the first substrate SUB1, and a liquid crystal layer formed between the first substrate SUB1 and second substrate SUB2. Note that the first substrate SUB1 may be referred to as an array substrate, and the second substrate SUB2 may be referred to as a counter-substrate. A liquid crystal driver IC1 which drives the liquid crystal display panel LCD is mounted on the first substrate SUB1, for example. The liquid crystal driver IC1 may be referred to as a first IC chip or a driver circuit.

The liquid crystal display panel LCD integrally comprises a capacitive touch sensor SE, for example. In the example of the drawing, on a surface of a display area (which may also be referred to as an active area) DA of the liquid crystal display panel LCD, a detection element (which may also be referred to as a detection electrode) Rx which forms the touch sensor SE is provided. This type of sensor-equipped display device DSP is referred to as an on-cell device. Alternatively, the display device DSP may be an in-cell device in which an electrode which forms the touch sensor SE is provided within the liquid crystal display panel LCD. The touch sensor SE is controlled by a touchpanel controller IC2 (which may also be referred to as a second IC chip or a sensor circuit).

Further, an application processor (which may also be referred to as a first control unit) HOS is provided, and the application processor HOS is connected to the liquid crystal display panel LCD via a flexible printed circuit FPC1 and the liquid crystal driver IC1, and connected to the touch sensor SE via a flexible printed circuit FPC2 and the touchpanel controller IC2. The liquid crystal driver IC1 and touchpanel controller IC2 mentioned above may be structured in the same chip.

A backlight unit BL which illuminates the liquid crystal display panel LCD is disposed below the first substrate SUB1. A flexible printed circuit FPC3 connects the backlight unit BL and the application processor HOS. As the backlight unit BL, various types of backlight unit BL are applicable, and as a light source, a product using a light-emitting diode (LED) or a backlight unit BL using a cold cathode fluorescent lamp (CCFL), etc., is available.

Although the sensor-equipped display device DSP is provided with a power supply circuit, etc., other than a battery (a secondary battery) BATT, FIG. 1 does not illustrate such an element.

FIG. 2 takes out and shows a main circuit block, which is a part of FIG. 1. A portion surrounded by a broken line in FIG. 2 represents the part of the first substrate SUB1. In a non-display area of the second substrate SUB2, a gate circuit GD is structured. Also, next to the gate circuit GD, a common electrode driving circuit CD is structured.

Further, a source selection circuit (which may also be referred to as a multiplexer) MUP is structured in a lower non-display area of the second substrate SUB2. The liquid crystal driver IC1 can control the gate circuit GD and the common electrode driving circuit CD. Also, the liquid crystal driver IC1 can write a pixel signal to a pixel (which may also be referred to as a display element) of the liquid crystal display panel LCD via the source selection circuit MUP. In this way, the liquid crystal display panel LCD can set a write period with respect to a pixel and a touch detection period.

The touchpanel controller IC2 can process a touch detection signal obtained from a touch detection electrode, and obtain coordinate data on a contact position of the user's finger relative to a display surface.

The liquid crystal driver IC1 intercommunicates with the application processor HOS, and requests and receives, for example, data.

The application processor HOS can supply video data, a command, a synchronization signal, etc., to the liquid crystal driver IC1.

The application processor HOS, the liquid crystal driver IC1, and the touchpanel controller IC2 are driven by power supply from the battery BATT.

FIG. 3 schematically shows a part of an equivalent circuit on the first substrate SUB1 of the liquid crystal display panel LCD.

The liquid crystal display panel LCD includes a display area DA in which an image is displayed. In the first substrate SUB1, in a non-display area of the first substrate SUB1, the source selection circuit MUP, the gate circuit GD, the common electrode driving circuit CD, and an outer lead bonding pad group (hereinafter referred to as an OLB pad group) pG1 are formed.

The liquid crystal driver IC1 is connected to the source selection circuit MUP, the gate circuit GD, the common electrode driving circuit CD, and the OLB pad group pG1. Although the entirety is not shown, the liquid crystal driver IC1 and the gate circuit GD are connected to each other by a control line which outputs a panel control signal. The liquid crystal driver IC1 can give a control signal to a control switching element CSW1 via the control line.

In the display area DA, pixels PX are located between the first substrate SUB1 and the second substrate (not shown). The pixels PX are arrayed in an m×n matrix in a first direction X and a second direction Y where m and n are positive integers.

In the display area DA, n gate lines G (G1 to Gn), m source lines S (S1 to Sm), common electrodes CE (C1 to Cn), etc., are formed on the first substrate SUB1.

The gate lines G extend substantially linearly in the first direction X, are led out to the outside of the display area DA, and are connected to the gate circuit GD. The gate lines G are aligned to be spaced apart from each other in the second direction Y. The gate lines G (G1, G2, . . . , Gn) are connected to control switching elements CSW1, respectively.

The source lines S extend substantially linearly in the second direction Y, and cross the gate lines G. The source lines S are aligned to be spaced apart from each other in the first direction X. The source lines S are led out to the outside of the display area DA, and connected to the source selection circuit MUP.

The common electrodes CE (C1, C2, . . . , Cn) extend substantially linearly in the first direction X, and are aligned to be spaced apart from each other in the second direction Y.

The common electrodes CE may be divisional electrodes bundled by multiple electrodes (for example, three electrodes). In this case, the common electrodes CE (C1 to Cn) are configured as n/3 divisional electrodes C (C1 to Cn/3). Hereinafter, the embodiment will be described assuming that the common electrodes CE are structured.

The common electrodes CE are led out to the outside of the display area DA, and are connected to the common electrode driving circuit CD. The gate lines G, the source lines S, and the common electrodes CE are not necessarily extended linearly, but part of them may be bent.

The gate circuit GD comprises n control switching elements CSW1. Each of n control switching elements CSW1 is selectively closed (to establish an on state) or opened (to establish an off state), so that permission or prohibition of writing a pixel signal to a corresponding pixel PX can be controlled. Also, n control switching elements CSW1 may be concurrently closed (to establish an on state) in an abnormal state (i.e., at the time of specific control operation), for example, to allow writing of a black level image signal, for example, in all pixels PX.

The pixel signal is sequentially written to a pixel connected to a selected gate line via the source selection circuit MUP.

FIG. 4 is an equivalent circuit diagram showing the pixel PX shown in FIG. 3. The pixel PX comprises a pixel switching element PSW, a transparent pixel electrode PE, a transparent common electrode CE, etc. The pixel switching element PSW is formed of, for example, a thin film transistor (TFT). The pixel switching element PSW is electrically connected to the gate line G and the source line S. The pixel switching element PSW may be either a top-gate TFT or a bottom-gate TFT. Further, although a semiconductor layer of the pixel switching element PSW is formed of, for example, polysilicon, it may be formed of amorphous silicon.

The pixel electrode PE is electrically connected to the pixel switching element PSW. The pixel electrode PE is opposed to the common electrode CE via an insulating film. The common electrode CE, the insulating film, and the pixel electrode PE form a storage capacitor CS. When a pixel signal is written to the storage capacitor CS, spatial light modulation of liquid crystal LQ between the pixel electrode PE and the common electrode CE is realized according to the voltage.

FIG. 5 shows, in particular, a block configuration example inside the liquid crystal driver IC1, which is an IC chip.

Video data from the application processor HOS is input to a video memory 202 via an interface receiver 201. The video data read from the video memory 202 is latched in a line latch circuit 203. The line latch circuit 203 can latch video data of one line or a plurality lines of the liquid crystal display panel LCD.

The video data corresponding to each pixel which has been read from the line latch circuit 203 is subjected to digital-to-analog conversion by a source amplifier 204, and becomes a pixel signal by performing gamma correction, etc., by amplification. The pixel signal obtained in this way is written to a pixel (a display element) of the liquid crystal display panel LCD. More specifically, the pixel signal is written to the storage capacitor CS shown in FIG. 4.

Blocks of the video memory 202, the line latch circuit 203, the source amplifier 204, etc., as a whole may be called a video data processing unit 241. The pixel signal generated in the video data processing unit 241 is input to a display element array unit 240a. The display element array unit 240a is integrated with a touch detection element array unit 240b.

Meanwhile, a synchronization signal, a command, etc., from the application processor HOS is retrieved by means of the interface receiver 201. The synchronization signal and the like retrieved by the interface receiver 201 is input to a timing controller 213.

The timing controller 213 can set an operation mode and an operating sequence of the liquid crystal driver IC1 or switch the operation mode in accordance with the command. The operation mode includes periods such as a write period in which the pixel signal is written to a pixel of each horizontal line, a pixel display period, and a touch detection period (a non-display period).

The timing controller 213 generates various timing pulses to realize the aforementioned sequence, on the basis of an internal clock from an oscillator 214.

Note that the interface receiver 201 converts an external clock rate of digital data sent from the application processor HOS into an internal clock rate for the internal digital data. For example, a write operation of the interface receiver 201 synchronizes with the external clock, and a read operation synchronizes with the internal clock.

The timing controller 213 can refer to external horizontal synchronization signal HSYNC from the interface receiver 201 and synchronize with external horizontal synchronization signal HSYNC.

Various timing pulses for display of the timing controller 213 are input to the video memory 202, the line latch circuit 203, the source amplifier 204, and a panel control signal generation unit 220. Further, various timing pulses for a sensor of the timing controller 213 are input to a touch detection element control signal generation unit 231 and a touch interface 232.

The panel control signal generation unit 220 generates a driving signal for the gate circuit GD and the common electrode driving circuit CD, and realizes video display of the liquid crystal display panel LCD. The touch detection element control signal generation unit 231 generates the so-called touch detection driving signal for driving the sensor SE.

In this way, the liquid crystal driver IC1 can set a write period with respect to a pixel and a touch detection period in the liquid crystal display panel LCD.

The touch interface 232 receives detection signal Rxs from the detection element Rx, and hands it over to the touchpanel controller IC2. The touchpanel controller IC2 determines the position on the display surface that is being touched by the user's finger or a stylus by using detection signal Rxs from the detection element Rx.

Note that the detection element Rx can be formed by using, for example, indium-tin-oxide (ITO), which is transparent.

In the above structure, blocks of the panel control signal generation unit 220, the touch detection element control signal generation unit 231, the timing controller 213, the oscillator 214, etc., as a whole may be called a scan driving unit 242. Accordingly, the scan driving unit 242 comprises a second clock generation unit (the oscillator 214), and a pixel signal and a display driving signal can be sequentially supplied to display elements in a time-sharing manner in synchronization with a clock of the second clock generation unit 214, thereby performing display scanning. Further, the scan driving unit 242 supplies the touch detection driving signal to a touch detection element.

Also, in the above structure, blocks of the touch interface 232, the touchpanel controller IC2, etc., may be called a touch detection unit 243. The touch detection unit 243 can perform touch detection by sampling a detection output based on a touch detection element. By this operation, it is determined which part of the display surface is being touched by the user's finger or the stylus.

Figure 6A:
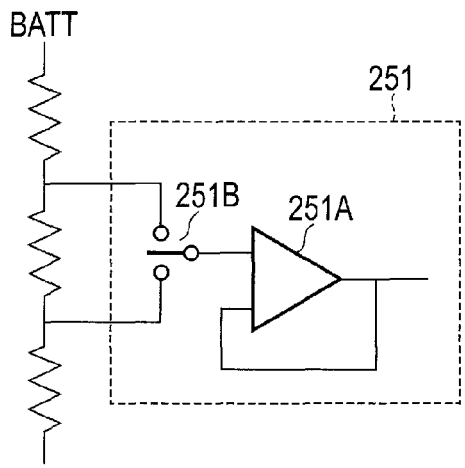
FIGS. 6A and 6B are illustrations each showing a configuration example of a power supply unit inside the liquid crystal driver of FIG. 5.
Figure 6B:
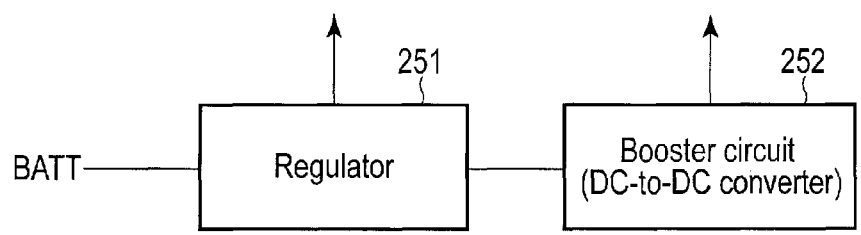

The liquid crystal driver IC1 comprises a regulator 251 and a booster circuit (a charge pump) 252 as a power supply unit of an internal circuit. The regulator 251 receives power supply from the battery BATT, as shown in FIG. 6A, for example, and generates a drive voltage by an output amplifier 251A and outputs the drive voltage stably. Here, potential voltages in two levels are retrieved from the battery BATT and selectively input by a selector switch 251B on the basis of a control instruction, so that the drive voltage can be controlled stepwise. This drive voltage is transmitted to the interface receiver 201, the video memory 202, the line latch circuit 203, the timing controller 213, and the oscillator 214. The booster circuit 252 is structured by, for example, a DC-to-DC converter. With the drive voltage in question, a boost frequency is controlled in receipt of power supply from the regulator 251 as shown in FIG. 6B, thereby boosting a direct-current voltage to a predetermined level and the boosted voltage is output to the source amplifier 204, the panel control signal generation unit 220, and the touch detection element control signal generation unit 231. Consequently, individual circuit blocks are operated appropriately inside the liquid crystal driver IC1.

Here, in the display device according to the above-described structure, a touch sensor is operated in a blanking period of liquid crystal driving. In the display device according to the present embodiment, while all of the common electrodes are fixed at a predetermined voltage in the display period and a signal is sequentially supplied to each pixel through each of the gate lines and source lines, in the blanking period, a signal is sequentially supplied only to a common electrode which contributes to touch detection. Accordingly, a panel driving load in a display driving period (the display period) is remarkably greater than that in a sensing operation period (the touch detection period) of the touch sensor. Accordingly, because of a periodic load variation in the display period and the touch detection period, the regulator 251 and the booster circuit 252 for the liquid crystal driving cannot catch up with the load variation, and thus, a ripple occurs in the power supply voltage. The ripple may produce noise due to vibration of components.

Hence, in the embodiment, one of or both of the regulator 251 and the booster circuit 252 are controlled dynamically in periods in which different loads are applied. With this control, a power control signal is generated by the timing controller 213, and output to the regulator 251 and the booster circuit 252. The regulator 251 and the booster circuit 252 control a drive voltage to an output destination on the basis of the power control signal, and perform mitigation driving so as to mitigate a difference between electrical loads.

Figure 7:
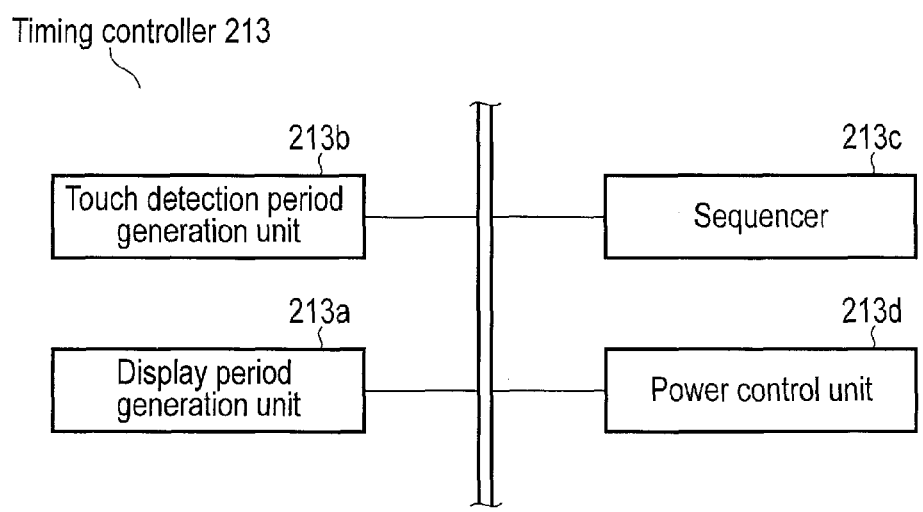
FIG. 7 is a diagram showing a configuration example of a timing controller inside the liquid crystal driver of FIG. 5.

More specifically, as shown in FIG. 7, the timing controller 213 comprises a display period generation unit 213a, a touch detection period generation unit 213b, a sequencer 213c, and a power control unit 213d. By the instruction from the sequencer 213c, the display period generation unit 213a sends a control signal to the video data processing unit 241 and the panel control signal generation unit 220 so that a predetermined period is treated as a video display period. Also, by the instruction from the sequencer 213c, the touch detection period generation unit 213b sends a control signal to the touch detection element control signal generation unit 231 and the touch interface 232 so that a predetermined period is treated as a touch detection period. Further, the power control unit 213d discriminates between the display period and the touch detection period by the instruction from the sequencer 213c, and generates control signals for setting drive voltages of their respective periods and sends them to the regulator 251 and the booster circuit 252 so as to reduce load variation.

First Embodiment

Figure 8:
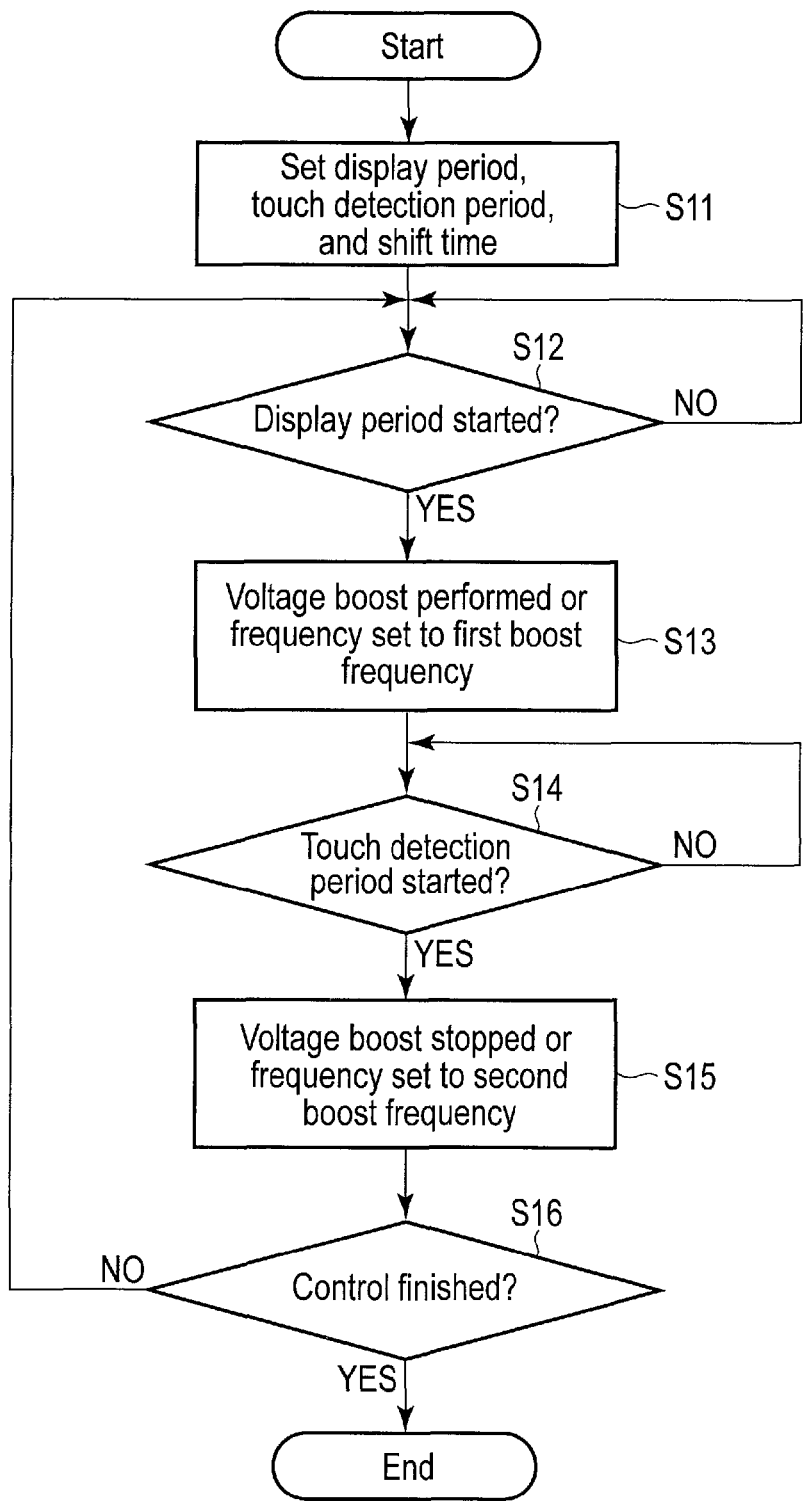
FIG. 8 is a flowchart showing the specifics of control which is processed by a sequencer indicated in FIG. 7, as a first embodiment for reducing load variation.

Referring to FIG. 8, and (a) to (d) of FIG. 9, a first embodiment for reducing the load variation will be described. In the first embodiment, it is assumed that the booster circuit (the charge pump) is stopped dynamically or a boost frequency is changed in periods in which different loads are applied. FIG. 8 is a flowchart showing the specifics of control of the first embodiment which is processed by the sequencer 213c, and FIG. 9 is a timing chart indicating the specifics of control of FIG. 8.

First, when the display device is powered on, setting of the display period and the touch detection period is performed (step S11). When the display period starts, the booster circuit 252 is powered on or the frequency is set to a first boost frequency for display driving (steps S12 and S13). Next, when the touch detection period starts, the booster circuit 252 is powered off or the frequency is set to a second boost frequency for display stopping (steps S14 and S15). Then, the processing of steps S12 to S15 is repeated until completion of the control is instructed by the power-off (step S16), and when the completion of the control is instructed, a series of operation is completed.

Figure 9:
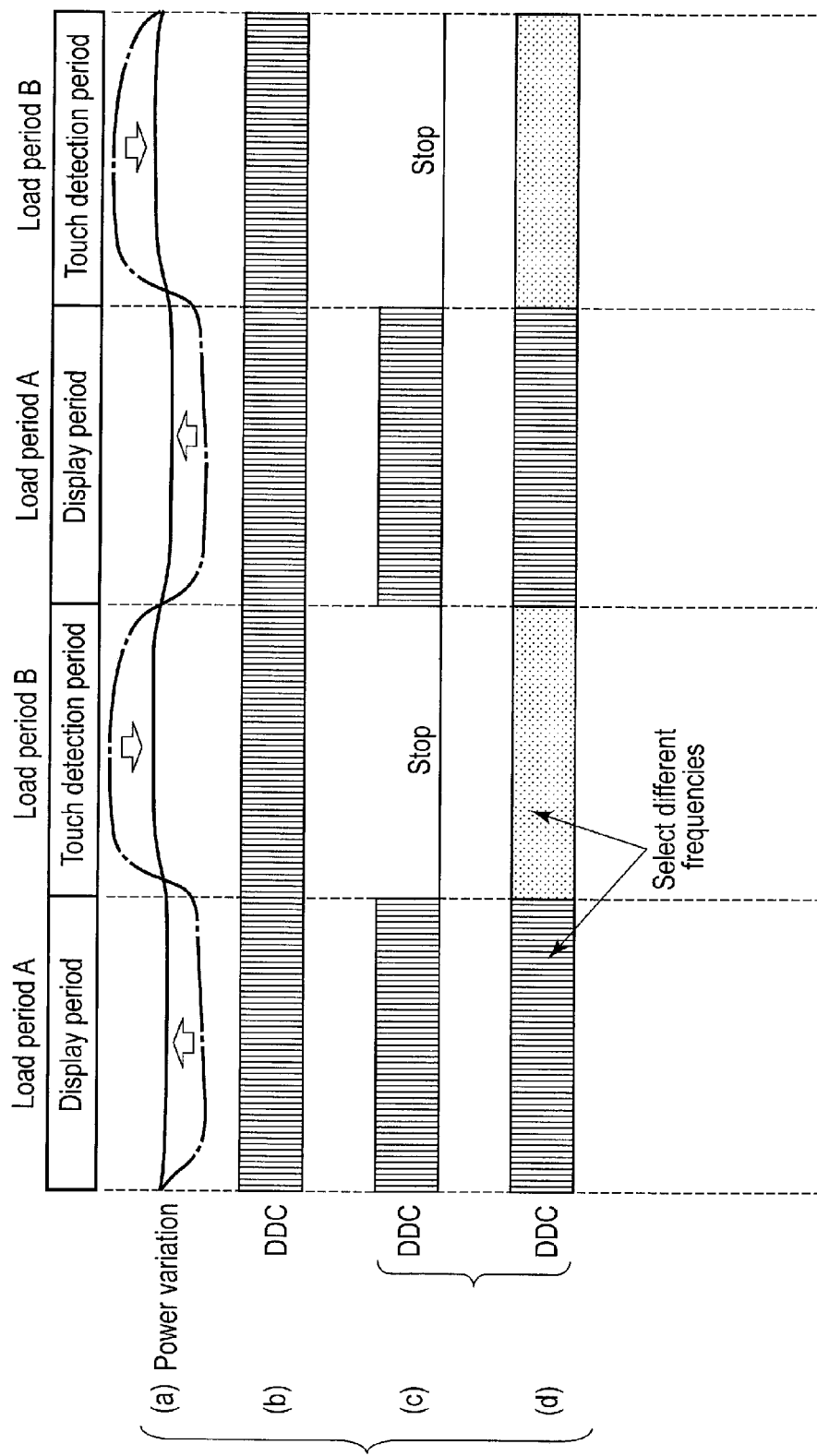
FIG. 9 is a timing chart indicating the specifics of control of FIG. 8.

Illustrations (a) to (d) of FIG. 9 indicate this state. Illustration (a) of FIG. 9 shows the state of power variation in load period A (display period) and load period B (touch detection period). Further, (b) of FIG. 9 shows that no control is performed in either load period A (display period) or load period B (touch detection period). In this case, as shown by a one-dot chain line, the power output changes greatly periodically in (a) of FIG. 9. In contrast, as shown in (c) of FIG. 9, in the present embodiment, the voltage is set to a boosted voltage under normal conditions in a display period of load period A, and stops a boosted output in a touch detection period of load period B. Alternatively, as shown in (d) of FIG. 9, the frequency is set to a boost frequency (the first boost frequency) under normal conditions in a display period of load period A, and set to the second boost frequency which is lower than the first boost frequency in a touch detection period of load period B. Variation in the power source voltage which occurs in load periods A and B can thereby be sufficiently suppressed as shown by a solid line in (a) of FIG. 9.

Second Embodiment

Figure 10:
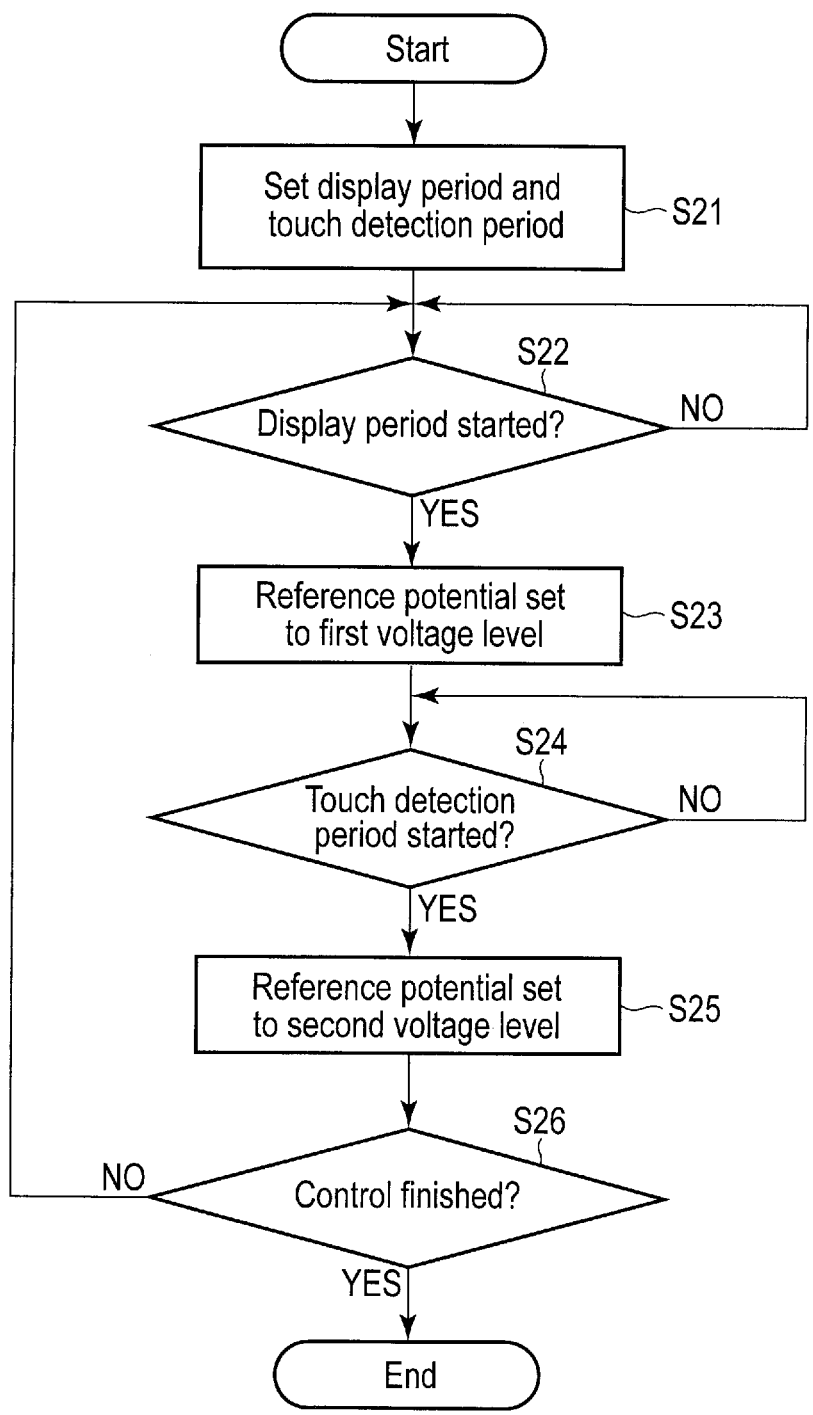
FIG. 10 is a flowchart showing the specifics of control which is processed by the sequencer indicated in FIG. 7, as a second embodiment for reducing load variation.

Referring to FIG. 10, and (a) to (d) of FIG. 11, a second embodiment for reducing the load variation will be described. In the second embodiment, when the regulator 251 or the booster circuit 252 is provided with a feedback circuit, it is assumed that a reference potential is changed dynamically. FIG. 10 is a flowchart showing the specifics of control of the second embodiment which is processed by the sequencer 213c, and FIG. 11 is a timing chart indicating the specifics of control of FIG. 10.

First, when the display device is powered on, setting of the display period and the touch detection period is performed (step S21). When the display period starts, the reference potential of the booster circuit 252 is set to a first voltage level specified for the display period (steps S22 and S23). Next, when the touch detection period starts, the reference potential of the booster circuit 252 is set to a second voltage level which is lower than the first voltage level (steps S24 and S25). Then, the processing of steps S22 to S25 is repeated until completion of the control is instructed by the power-off (step S26), and when the completion of the control is instructed, a series of operation is completed.

Illustrations (a) to (d) of FIG. 11 indicate this state. Illustration (a) of FIG. 11 shows the state of power variation in load period A (display period) and load period B (touch detection period). Further, (b) of FIG. 11 shows that no control is performed in either load period A (display period) or load period B (touch detection period). In this case, as shown by a one-dot chain line, the power output changes greatly periodically in (a) of FIG. 11. In contrast, as shown in (c) of FIG. 11, in the present embodiment, the reference potential of the booster circuit 252 is set to the first voltage level under normal conditions in the display period, in the display period of load period A, and is set to the second voltage level which is lower than the first voltage level in the touch detection period of load period B. Variation in the power source voltage which occurs in load periods A and B can thereby be sufficiently suppressed as shown by a solid line in (a) of FIG. 11.

Although the case of controlling the reference potential of the booster circuit 252 has been described for the above embodiment, the reference potential of the regulator 251 may be controlled. That is, as shown in (d) of FIG. 11, a similar advantage can be obtained even by setting the reference potential of the regulator 251 to the first voltage level in the display period of load period A, and setting the reference potential of the regulator 251 to the second voltage level which is lower than the first voltage level in the touch detection period of load period B. As a matter of course, the regulator 251 and the booster circuit 252 may be controlled together.

Third Embodiment

In both of the first and the second embodiments, display period A and touch detection period B are fixed. However, a load may be changed greatly for each of the switching of the periods, which may affect a response or image quality. This is noticeable at the time of boost switching of the booster circuit 252. Hence, in the third embodiment, considering the influence on the response and image quality, the boost switching timing at a load variation border is to be controlled. FIG. 12 is a flowchart showing the specifics of control of the third embodiment which is processed by the sequencer 213c, and FIG. 13 is a timing chart indicating the specifics of control of FIG. 12.

Figure 13:
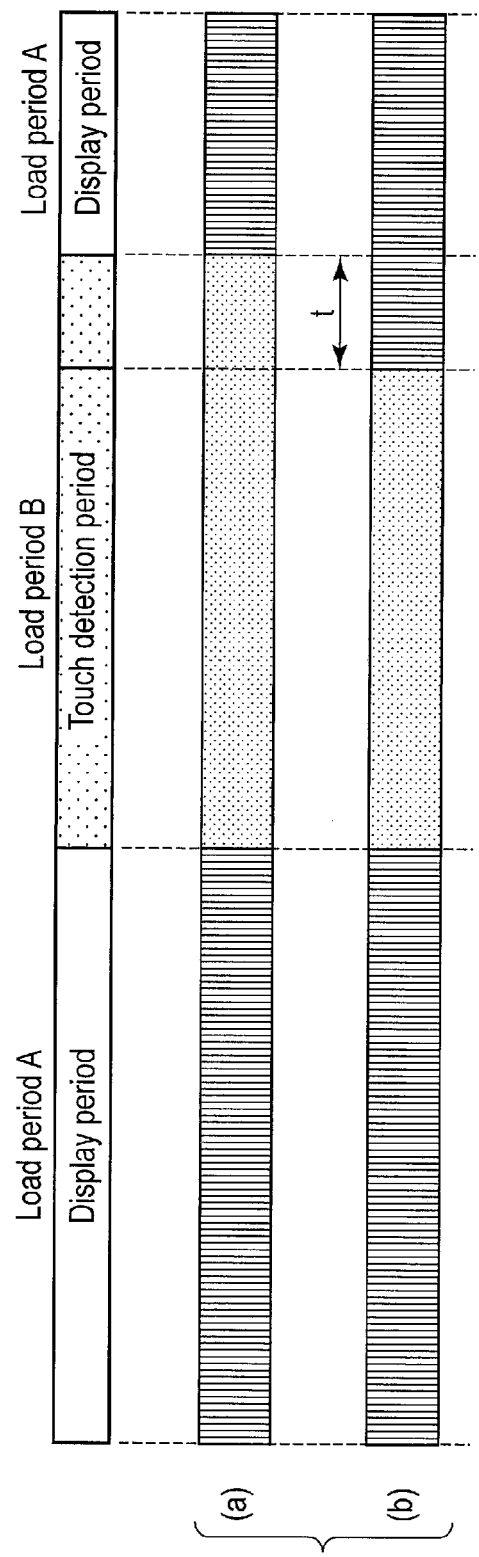
FIG. 13 is a timing chart indicating the specifics of control of FIG. 12.

First, when the display device is powered on, display period A and touch detection period B are set as standard, as shown in (a) of FIG. 13, and time t for shifting the timing of an end of touch detection period B, that is, the timing of a start of display period A, is set, as shown in (b) of FIG. 13 (step S31). When display period A is started, voltage boost is performed or the frequency is set to the first boost frequency (steps S32 and S33), and a lapse of display period A is monitored by, for example, a count of a clock, to determine the ending of display period A (step S34). When the ending of display period A is detected, touch detection period B is started and the voltage boost is stopped or the frequency is set to the second boost frequency (steps S35 and S36), and a lapse of touch detection period B is monitored by, for example, a count of the clock in accordance with shift time t, to determine the ending of touch detection period B (step S37). Then, the processing of steps S32 to S37 is repeated until completion of the control is instructed by the power-off (step S38), and when the completion of the control is instructed, a series of operation is completed.

According to the above processing, as shown in (b) of FIG. 13, display can be started earlier by time t than display period A which is set as standard. That is, voltage boost is executed when a period is switched from the non-display period to the display period. More specifically, when a period is shifted from touch detection period (non-display period) B to display period A, as shown in (a) of FIG. 13, a frequency at the time of display period is input at the time of touch detection period (non-display period) B, as shown in (b) of FIG. 13, prior to the start of subsequent display period A by time t (where t is a shift time of starting the voltage boost), thereby executing pre-charge. Consequently, display carried out in subsequent display period A is operated smoothly from the start. In this way, it becomes possible to mitigate a sudden load variation.

While the above-mentioned shift time t may be fixed, it may be changed randomly or periodically. Further, not only when a period is shifted from touch detection period (non-display period) B to display period A, but also when a period is switched from display period A to touch detection period B, the timing of voltage boost may be controlled.

Fourth Embodiment

Figure 14:
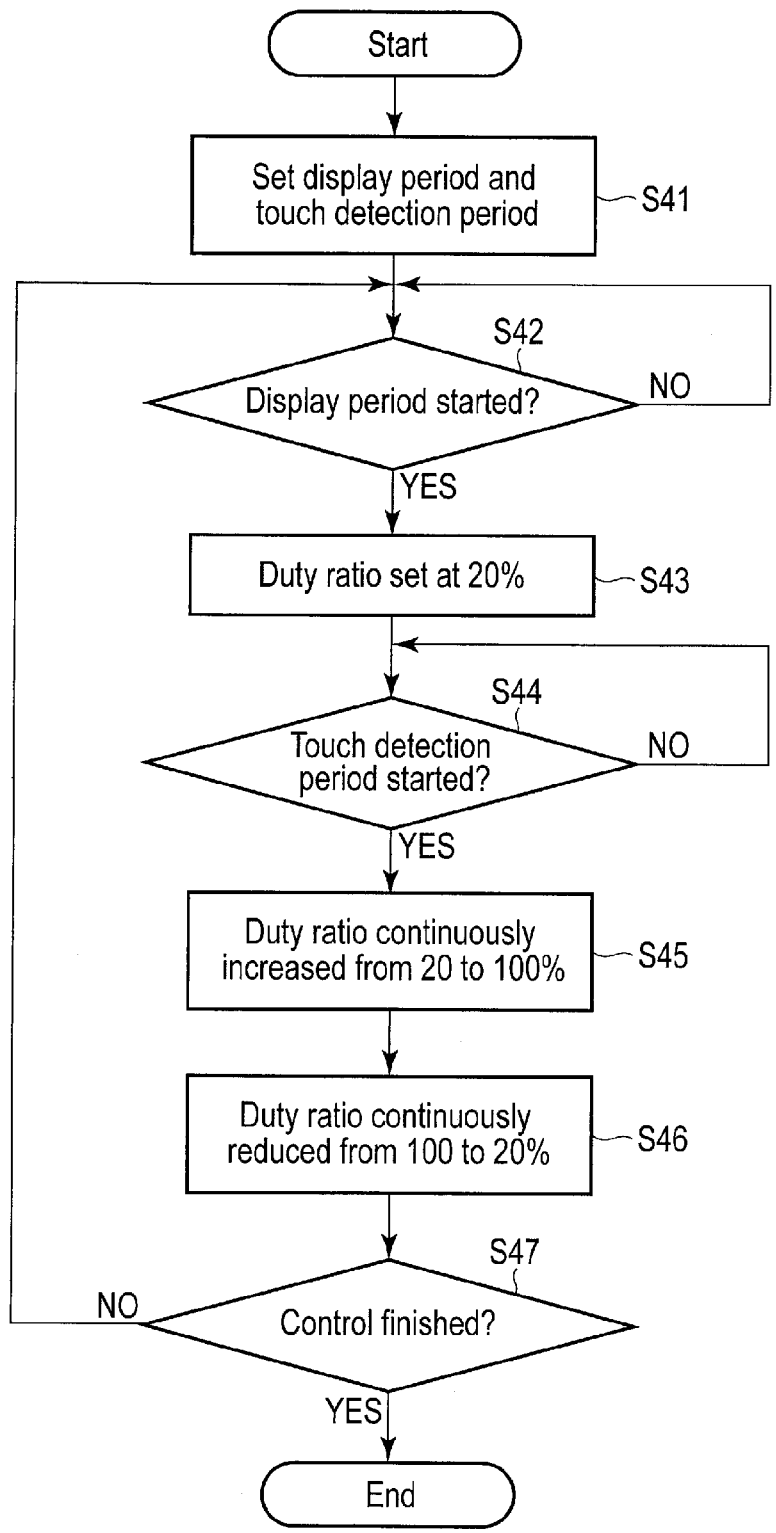
FIG. 14 is a flowchart showing the specifics of control which is processed by the sequencer indicated in FIG. 7, as a fourth embodiment for reducing load variation.
Figure 15:
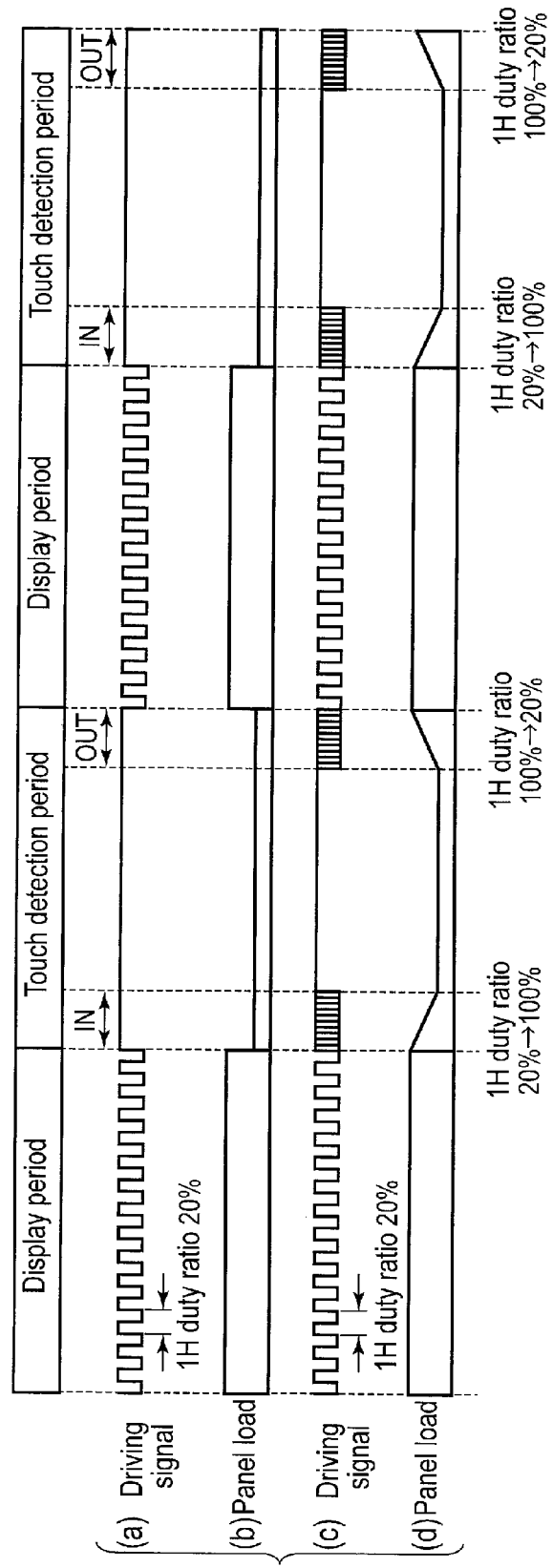
FIG. 15 is a timing chart indicating the specifics of control of FIG. 14.

In the third embodiment described above, considering the impact on the response and image quality caused by the load being varied greatly for each of the switching of the display period and the touch detection period, the boost switching timing at a load variation border is controlled. In a fourth embodiment to be described below, in the case of a low-temperature polysilicon (LTPS) display panel, in the touch detection period (the non-display period), an LTPS driving signal is subjected to modulation control at the time of switching between the non-display and display periods, thereby reducing an abrupt load variation. FIG. 14 is a flowchart showing the specifics of control of the fourth embodiment which is processed by the sequencer 213c, and FIG. 15 is a timing chart indicating the specifics of control of FIG. 14. Here, a pulse width modulation whereby a pulse width of a 1H horizontal period is variable is adopted for the LTPS driving signal, and it is assumed that the modulation is performed at a duty ratio of 20% in the display period, and a duty ratio of 100% in the touch detection period. A modulated waveform of a conventional LTPS driving signal is shown in (a) of FIG. 15, and a change in panel load at that time is shown in (b) of FIG. 15. As can be seen, with a conventional method, a sudden load variation occurs at a border between the display period and the touch detection period.

In contrast, in the fourth embodiment, when the display device is powered on, the display period and the touch detection period are set as standard, as shown in (a) of FIG. 15, and also, a predetermined time from the start of the touch detection period (hereinafter referred to as an "IN period") and a predetermined time before the end of the touch detection period (hereinafter referred to as an "OUT period") are set, respectively (step S41). When the display period is started, the duty ratio is set at 20% (steps S42 and S43), and a lapse of the display period is monitored by, for example, a count of a clock, to determine the ending of the display period (step S44). When the ending of the display period is detected, after the touch detection period has been started, the duty ratio is continuously increased from 20 to 100% within the IN period (step S45). Next, a lapse of the touch detection period is monitored by, for example, a count of the clock, and the duty ratio is continuously reduced from 100 to 20% within the OUT period of the touch detection period (step S46). Then, the processing of steps S42 to S46 is repeated until completion of the control is instructed by the power-off (step S47), and when the completion of the control is instructed, a series of operation is completed.

Note that the rate or degree of change when the duty ratio between the touch detection period and the display period is changed sequentially is not limited to the above, and a value according to the performance of the display device or the performance of the IC, etc., can be adopted.

According to the above structure, with respect to the LTPS driving signal, the duty ratio is continuously increased from 20 to 100% within the IN period of the touch detection period, and the duty ratio is continuously reduced from 100 to 20% in the OUT period, as shown in (c) of FIG. 15. In this way, the panel load is gradually increased or reduced in the IN period and the OUT period of the touch detection period, as shown in (d) of FIG. 15, and a sudden load variation can be prevented.

Further, in the fourth embodiment described above, although it has been described that the pulse width modulation is adopted for the LTPS driving signal, the modulation is not limited to the above. That is, even if frequency modulation is adopted, the embodiment can be implemented similarly. In the case of frequency modulation, the frequency should be set in such a way that a first frequency is adopted in a 1H horizontal period of the display period, a second frequency is adopted in a 1H horizontal period of the touch detection period, the first frequency is raised or lowered to the second frequency in an IN period of a touch horizontal period, and the second frequency is raised or lowered to the first frequency in an OUT period.

Other Embodiment

In the second to fourth embodiments described above, the lengths of the display period and the touch detection period (the non-display period) are changed every time. In this way, since a ripple of a power source voltage caused by the periodicity of each period is reduced, it becomes possible to reduce the load variation.

Also, in each of the above embodiments, since a period of detecting a touch by a finger (i.e., the touch detection period which involves a finger) has been described as an example of the non-display period, the other forms of the non-display period include a period of detecting a touch by an active stylus, an optical detection period using a scanner display, a period of detecting that an ear is close using a proximity sensor, etc. Further, for a security purpose, for example, the embodiment may also be applied to an application which assumes a proximity detection period using a proximity sensor to be a non-display period and performs face detection processing of a proximal object (a person) by a camera.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device comprising: a display panel configured to display an image; and a driver configured to drive the display panel, wherein the driver comprises: a power supply device configured to supply drive power to the display panel, and to selectively drive the display panel in a display state and a non-display state depending on an amount of the power supply; and a controller configured to control the power supply device, the controller determining a display period in which the image is displayed on the display panel and a non-display period in which the image is not displayed, and switchably controlling the amount of the drive power supplied to the display panel by the power supply device between the display period and the non-display period, and the controller causing the power supply device to execute, in the non-display period, mitigation driving which gradually increases in an electrical load for a predetermined period after the display period and gradually decreases in the electrical load for a predetermined period before a next display period starts.

2. The display device of claim 1, wherein when the power supply device comprises a booster circuit which generates power for driving the display panel in the display state, the controller causes an amount of voltage boost by the booster circuit to be gradually changed as the mitigation driving.

3. The display device of claim 1, wherein when the power supply device comprises a booster circuit which generates power for driving the display panel in the display state, the controller causes a boost frequency of the booster circuit to be gradually changed as the mitigation driving.

4. The display device of claim 1, wherein when the power supply device comprises a booster circuit which generates power for driving the display panel in the display state, the controller causes a reference potential in the non-display period of the booster circuit to be gradually changed from a reference potential in the display period as the mitigation driving.

5. The display device of claim 1, wherein when the power supply device comprises a regulator which generates power for driving the display panel in the display state, the controller causes a reference potential in the non-display period of the regulator to be gradually changed from a reference potential in the display period as the mitigation driving.

6. The display device of claim 1, wherein the controller causes a length of at least one of the display period and the non-display period to be changed as the mitigation driving.

7. A display drive method comprising: supplying drive power to a display panel which displays an image, and selectively driving the display panel in a display state and a non-display state depending on an amount of the power supply, wherein a display period in which the image is displayed on the display panel and a non-display period in which the image is not displayed are determined, and the amount of the drive power supplied to the display panel is switchably controlled between the display period and the non-display period; and in the non-display period, mitigation driving, which gradually increases in an electrical load for a predetermined period after the display period and gradually decreases in the electrical load for a predetermined period before a next display period starts, is executed.

8. The display drive method of claim 7, wherein when the drive power in the display state of the display panel is boosted in supplying the drive power, an amount of the boosting is gradually changed as the mitigation driving.

9. The display drive method of claim 7, wherein when the drive power in the display state of the display panel is boosted in supplying the drive power, a boost frequency of the boosting is gradually changed as the mitigation driving.

10. The display drive method of claim 7, wherein when the drive power in the display state of the display panel is boosted on the basis of a reference potential in supplying the drive power, a reference potential in the non-display period of the display panel is gradually changed from a reference potential in the display period as the mitigation driving.

11. The display drive method of claim 7, wherein when the drive power in the display state of the display panel is stabilized on the basis of a reference potential in supplying the drive power, a reference potential in the non-display period of the display panel is gradually changed from a reference potential in the display period as the mitigation driving.

12. The display drive method of claim 7, wherein a length of at least one of the display period and the non-display period is varied as the mitigation driving.

13. The display device of claim 1, wherein the display panel includes a liquid crystal display.

14. The display device of claim 1, wherein the power supply device includes one or both of a regulator and a booster circuit.

* * * * *